(12) United States Patent
Yoshidomi et al.

(10) Patent No.: US 8,624,453 B2
(45) Date of Patent: Jan. 7, 2014

(54) MOTOR WITH ENCODER AND ENCODER FOR MOTOR

(71) Applicant: Kabushiki Kaisha Yaskawa Denki, Kitakyushu (JP)

(72) Inventors: Shirou Yoshidomi, Kitakyushu (JP); Yuji Arinaga, Kitakyushu (JP); Hiroyuki Fujita, Kitakyushu (JP); Yasuhiro Matsutani, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/756,548

(22) Filed: Feb. 1, 2013

(65) Prior Publication Data

US 2013/0140963 A1 Jun. 6, 2013

Related U.S. Application Data

(63) Continuation of application No. 13/527,600, filed on Jun. 20, 2012, now abandoned, which is a continuation of application No. 13/290,995, filed on Nov. 7, 2011, now abandoned.

(30) Foreign Application Priority Data

Nov. 8, 2010 (JP) ................................. 2010-249737

(51) Int. Cl.
*H02K 11/00* (2006.01)
(52) U.S. Cl.
USPC ....................................................... 310/68 B
(58) Field of Classification Search
USPC .................................................. 310/68 B, 79
See application file for complete search history.

(56) References Cited

U.S. PATENT DOCUMENTS

| | | | | |
|---|---|---|---|---|
| 4,733,116 A | * | 3/1988 | Schulz | 310/68 B |
| 6,124,710 A | * | 9/2000 | Kordecki | 324/207.2 |
| 6,462,442 B1 | * | 10/2002 | Braun et al. | 310/68 B |
| 6,693,422 B2 | * | 2/2004 | Lutz | 324/207.2 |
| 7,989,998 B2 | * | 8/2011 | Nagamatsu et al. | 310/68 B |
| 8,106,562 B2 | * | 1/2012 | Krogh et al. | 310/232 |
| 8,134,262 B2 | * | 3/2012 | Siraky | 310/68 B |
| 2010/0060112 A1 | | 3/2010 | Nagamatsu et al. | |

FOREIGN PATENT DOCUMENTS

| | | |
|---|---|---|
| JP | 60-008567 U | 1/1985 |
| JP | 08-080010 | 3/1996 |
| JP | 2000-134857 | 5/2000 |
| JP | 2003-235197 | 8/2003 |
| JP | 2010-094007 | 4/2010 |

OTHER PUBLICATIONS

Japanese Office Action for corresponding JP Application No. 2010-249737, Jul. 1, 2013.
Japanese Office Action for corresponding JP Application No. 2010-249737, Feb. 27, 2013.

* cited by examiner

*Primary Examiner* — Thanh Lam
(74) *Attorney, Agent, or Firm* — Ditthavong Mori & Steiner, P.C.

(57) ABSTRACT

A motor with an encoder has a motor, and an encoder disposed on the anti-load side of this motor. The motor includes a motor electromagnetic part, and a motor shaft rotatably supported by a load side bearing and an anti-load side bearing, and the encoder includes a hub having a convex part formed in a load side end thereof, the hub being coaxially fixed to an anti-load side end of the motor shaft, and a rotating disc fixed to an anti-load side end of this hub. The convex part of the hub is fitted to a concave part formed in the anti-load side end of the motor shaft so that the hub is fixed to the motor shaft.

9 Claims, 3 Drawing Sheets

MOTOR WITH ENCODER AND ENCODER FOR MOTOR

CROSS-REFERENCE TO RELATED APPLICATIONS

The present application is a continuation application of the U.S. patent application Ser. No. 13/527,600 filed Jun. 20, 2012, which in turn is a continuation application of the U.S. patent application Ser. No. 13/290,995 filed Nov. 7, 2011, which claims priority under 35 U.S.C. §119 to Japanese Patent Application No. 2010-249737, filed Nov. 8, 2010. The contents of these applications are incorporated herein by reference in their entirety.

BACKGROUND OF THE INVENTION

1. Field of the Invention

The present invention relates to a motor with an encoder having an encoder for detecting a rotation angle of a rotating body such as a motor output shaft, and an encoder for a motor used for this.

2. Description of the Related Art

Conventionally, there is a known motor with an encoder having an encoder for detecting a rotation angle of a rotating body such as a motor output shaft (for example, refer to JP A-2010-94007 ([0009] to [0013], FIG. 1)). This motor with the encoder of the conventional technique has a motor, and an optical type encoder disposed on the anti-load side of the motor. The motor includes an output shaft rotatably supported by a load side bearing and an anti-load side bearing, and an anti-load side bracket supporting the anti-load side bearing at an inner circumferential part. The encoder includes a hub fixed to an anti-load side end of the output shaft coaxially with an axis of the output shaft, and a rotating disc attached to an anti-load side end of the hub.

In this motor with the encoder, a convex part is provided in an end of the output shaft of the motor, and the convex part is inserted into a concave part provided in the hub of the encoder so that the output shaft and the hub are fixed.

SUMMARY OF THE INVENTION

According to an aspect of the present invention, there is provided a motor with an encoder includes a motor, and an encoder disposed on the anti-load side of the motor, wherein the motor includes a motor electromagnetic part, and an output shaft rotatably supported by a load side bearing and an anti-load side bearing, the encoder includes a hub having a convex part formed in a load side end thereof, the hub being coaxially fixed to an anti-load side end of the output shaft, and a rotating disc fixed to an anti-load side end of the hub, and the convex part of the hub is fitted to a concave part formed in the anti-load side end of the output shaft so that the hub is fixed to the output shaft.

According to another aspect of the present invention, there is provided an encoder for a motor disposed on the anti-load side of the motor including a motor electromagnetic part, and an output shaft rotatably supported by a load side bearing and an anti-load side bearing, the encoder including a hub having a convex part formed in a load side end thereof, the hub being coaxially fixed to an anti-load side end of the output shaft, and a rotating disc fixed to an anti-load side end of the hub, wherein the convex part of the hub is fitted to a concave part formed in the anti-load side end of the output shaft so that the hub is fixed to the output shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
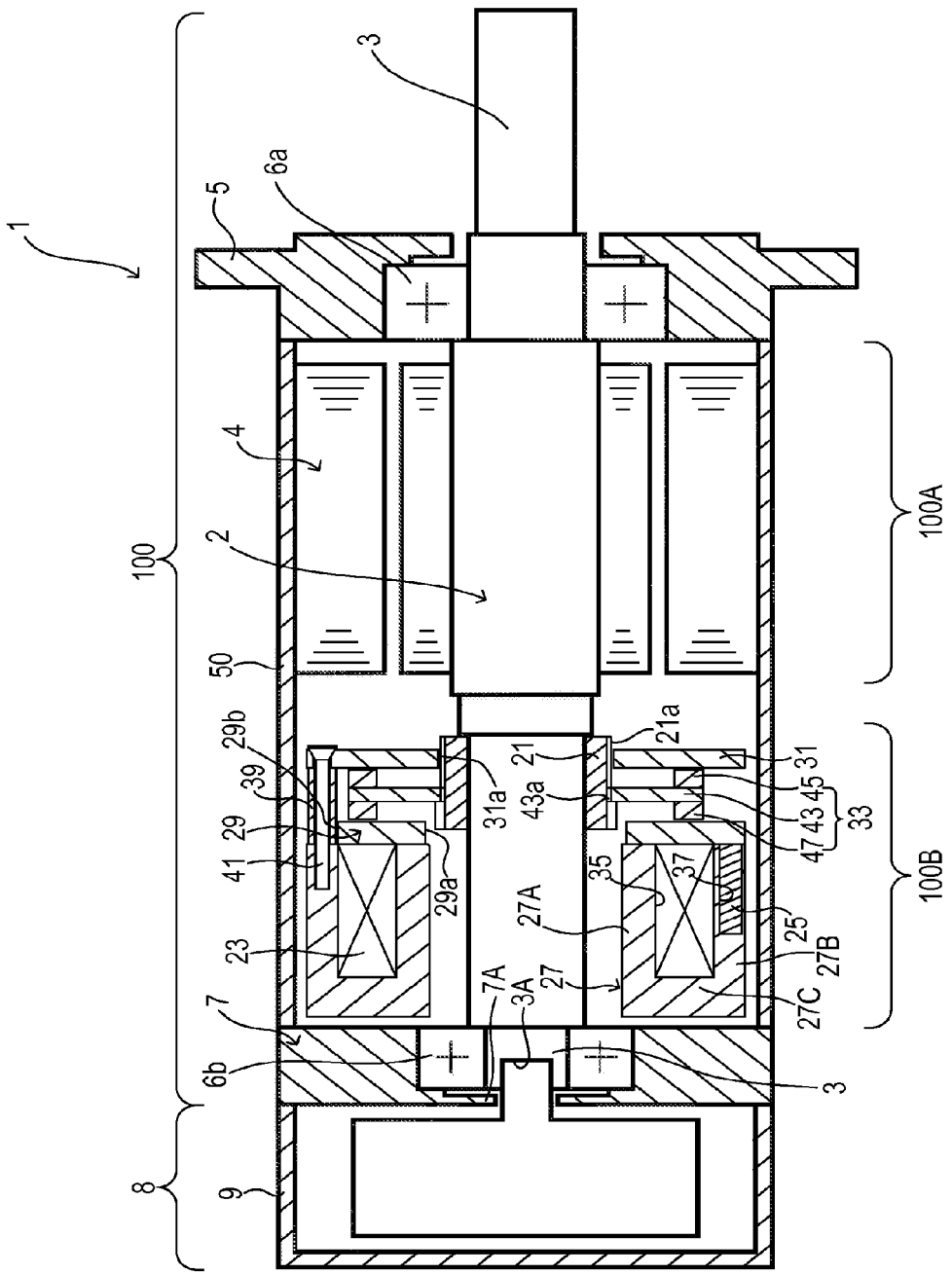
FIG. 1 is a vertically sectional view showing an entire configuration of a motor with an encoder of one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Firstly, before describing one embodiment of the present invention, problems and the like of a motor with an encoder and an encoder for a motor considered by the inventors of the present invention will be described.

As described above, the encoder is mainly divided into a magnetic type encoder and an optical type encoder. The magnetic type encoder includes for example a permanent magnet fixed to a motor output shaft, and a magnetic field detection element for detecting a magnetic field from this permanent magnet of a circular plate shape, so as to detect the magnetic field from the permanent magnet and detect a relative position and an absolute position of the output shaft. Therefore, there is a concern that a magnetic flux on the side of the motor is leaked out to the side of the encoder via the output shaft, a hub fixed to an anti-load side end of this output shaft, and the like, and interferes with a magnetic field of the magnetic type encoder. Although such interference due to the magnetic field is not as remarkable as the magnetic type encoder, there is a concern that the interference also influences an electronic circuit and the like in the optical type encoder.

Such leakage of the magnetic flux from the side of the motor is readily generated particularly in a case where the motor has a brake. This is because, due to the structure that the brake is disposed on the anti-load side of a motor electromagnetic part, that is, adjacent to the encoder, and a braking member for performing braking of a brake disc is moved in the shaft direction by excitation of a coil, the coil of the brake generates the magnetic flux in the shaft direction.

In a case of a structure that a convex part is provided in an end of the output shaft of the motor, and this is inserted into a concave part provided in the hub of the encoder so that the output shaft and the hub are fixed as in the above conventional technique, a convexo-concave structure corresponds to the direction of the leaked magnetic flux. Thus, the magnetic flux is readily leaked out from the side of the output shaft to the side of the hub. For example, in a case of the magnetic type encoder, there is a concern that such a leaked magnetic flux interferes with the magnetic flux of the permanent magnet, and a detection result by the encoder is influenced. For example, in a case of the optical type encoder, there is also a concern that the detection result by the encoder is influenced although the influence is less than the magnetic type encoder. For example, induced electromotive force is generated in the electronic circuit so that detection precision is lowered. In order to suppress such leakage of the magnetic flux, it is thought that a pressure welding shaft formed by a magnetic body and a non-magnetic body is used as the output shaft of the motor. However, use of such a pressure welding shaft or a non-magnetic body such as stainless leads to a cost increase in the encoder (motor).

The inventors of the present invention considered these points and the like for further improvement of reliability of the encoder regarding the motor with the encoder and the encoder for the motor, and as a result of further dedicated research, attained the present invention. It should be noted that the points and the like described here are only one example of the problems to be solved by the present invention, and the present invention is not limited to this example. Hereinafter, one embodiment of the present invention will be described with reference to the drawings.

FIG. 1 is a vertically sectional view showing an entire configuration of a motor with an encoder of the present embodiment.

In FIG. 1, a motor 1 with an encoder has a motor 100, and an encoder 8 (encoder for a motor) disposed on the anti-load side of this motor 100 (on the left side in FIG. 1) and provided with an encoder cover 9. It should be noted that in FIG. 1, a detailed structure of the encoder 8 is omitted. The detail of this encoder 8 will be described later with FIG. 2.

The motor 100 includes a motor frame 50, a motor electromagnetic part 100A and a brake part 100B disposed on the inner circumferential side of this motor frame 50, a load side bracket 5 and an anti-load side bracket 7 formed integrally with the motor frame 50, a load side bearing 6a with an outer wheel fitted to the load side bracket 5, an anti-load side bearing 6b with an outer wheel fitted to the anti-load side bracket 7, and a motor shaft 3 disposed in the shaft direction (in the left and right direction in FIG. 1) and rotatably supported by the load side bearing 6a and the anti-load side bearing 6b, the motor shaft serving as an output shaft.

The motor electromagnetic part 100A includes a rotor 2 fixed coaxially with the motor shaft 3, and a stator 4 fixed to the motor frame 50 so as to face an outer circumferential surface of this rotor 2 in the radial direction.

The brake part 100B is a non-excitation operation type electromagnetic brake for performing the braking to the anti-load side of the motor shaft 3, disposed on the anti-load side of the motor electromagnetic part 100A. This brake part 100B includes a torque transmission member 21 fixed to an outer circumferential part of the motor shaft 3, a field core 27 accommodating an excitation coil 23 and springs 25, an armature 29 disposed on the one side in the shaft direction (on the right side in FIG. 1) so as to face this field core 27 in the shaft direction, a side plate 31 disposed on the one side in the shaft direction of this armature 29, and a brake disc 33 disposed between this side plate 31 and the armature 29 and engaged with the torque transmission member 21.

The field core 27 includes an inner cylinder part 27A, an outer cylinder part 27B, and a bottom plate part 27C. A space in the radial direction between the inner cylinder part 27A and the outer cylinder part 27B serves as a coil concave part 35 opening on the right side in FIG. 1, and the excitation coil 23 is accommodated in this coil concave part 35. A plurality of spring concave parts 37 is formed at appropriately equal intervals in the circumferential direction on a surface of the outer cylinder part 27B on the one side in the shaft direction.

The springs 25 serving as compression coil springs are respectively accommodated in these spring concave parts 37. These springs 25 impose bias force for pressing toward the one side in the shaft direction onto the armature 29. It should be noted that surfaces of the inner cylinder part 27A and the outer cylinder part 27B on the one side in the shaft direction form a magnetic pole surface for magnetically attracting the armature 29.

The armature 29 is made of an appropriate magnetic material (such as a steel plate) and formed into a circular plate shape, and includes a through hole 29a on the center side in the radial direction. This armature 29 is disposed movably only in the shaft direction between the field core 27 and the brake disc 33.

The side plate 31 is formed into a disc shape, and includes a through hole 31a on the center side in the radial direction. An outer circumferential edge of the side plate 31 is fixed to the outer cylinder part 27B of the field core 27 by a plurality of fixing screws 41 while a collar 39 is placed inbetween. The collar 39 is inserted and disposed into a concave part 29b formed in an outer circumference of the armature 29, and prevents rotation of the armature 29.

The brake disc 33 includes a core plate 43, a friction material 45, and a friction material 47. This core plate 43 is made of an appropriate magnetic body and formed into a circular plate shape, and includes a spline 43a on an inner circumferential surface thereof. By engagement between this spline 43a and a spline 21a provided in the torque transmission member 21, the brake disc 33 is provided so as to be capable of moving in the shaft direction and incapable of rotating relative to the torque transmission member 21 (in other words, rotation is capable of being transmitted).

The friction material 45 is attached to a surface of an outer circumferential edge of the core plate 43 on the one side in the shaft direction, that is, the surface facing the side plate 31. The friction material 47 is attached to a surface of the outer circumferential edge of the core plate 43 on the other side in the shaft direction (on the left side in FIG. 1), that is, the surface facing the armature 29. It should be noted that instead of providing the friction material 45 and the friction material 47 in the core plate 43, the frictional materials may be provided on the sides of the side plate 31 and the armature 29 serving as facing members.

An operation of the brake part 100B with the above configuration will be described.

That is, in a state that the power is not distributed in the excitation coil 23 (=a non-excitation state), the braking is performed by the brake part 100B. Specifically, in this braking state, the armature 29 is pressed by the springs 25 so as to be moved to the one side in the shaft direction and brought into contact with the brake disc 33, and the brake disc 33 is brought into contact with the side plate 31 by contact with the armature 29 from the other side in the shaft direction. As a result, the brake disc 33 is sandwiched, pressed, and braked by the armature 29 and the side plate 31. Thereby, rotation of the motor shaft 3 is braked (the inertially rotating motor shaft 3 is made to be static, or by retaining the motor shaft 3 when rotating force (torque) is applied to the static motor shaft 3 from an exterior, a static state of the motor shaft 3 is maintained).

Meanwhile, in a state that the power is distributed in the excitation coil 23 (=an excitation state), the braking is not performed by the brake part 100B. Specifically, in this braking state, the excitation coil 23 gives magnetically attracting force toward the other side in the shaft direction to the armature 29 and the brake disc 33. Thereby, the armature 29 and the brake disc 33 are moved toward the other side in the shaft direction while acting against the bias force of the springs 25 for pressing the armature 29. As a result, the brake disc 33 is brought away from the side plate 31, the brake disc 33 is released from the braking, and the motor shaft 3 is made to be capable of rotating.

It should be noted that since the present embodiment is particularly effective in a case of the motor 100 having the electromagnetic type brake part 100B as exemplified above, the configuration and the operation of the brake part 100B are described in detail above. However, the configuration of the brake part 100B is not limited to this example, and with any electromagnetic brake part, the present embodiment can obtain effects described later. Further, even in a case where the brake part is disposed not on the anti-load side but on the load side, the present embodiment can obtain the same effects. Since an influence of a leaked magnetic flux of the motor electromagnetic part 100A can be reduced even with the motor 100 having no brake part, the present embodiment can obtain the same effects. However, in a case of having the brake part 100B disposed on the anti-load side as described above, the present embodiment can exert particularly great effects.

The load side bracket 5 is disposed on the load side of the motor electromagnetic part 100A (on the right side in FIG. 1), and supports the load side bearing 6a at an inner circumferential part of the motor 100.

The anti-load side bracket 7 is disposed between the brake part 100B and the encoder 8, and supports the anti-load side bearing 6b at the inner circumferential part of the motor 100. This anti-load side bracket 7 has a bearing cover 7A covering an anti-load side end of the anti-load side bearing 6b. It should be noted that in FIG. 1, a detailed structure of the bearing cover 7A is omitted. The detail of this bearing cover 7A will be described later with FIG. 2.

The load side bearing 6a and the anti-load side bearing 6b respectively rotatably and axially support both ends of the motor shaft 3. The load side bearing 6a is disposed on the load side of the motor electromagnetic part 100A as well as the load side bracket 5 to which the outer wheel thereof is fitted. The load side bearing 6b is disposed between the brake part 100B and the encoder 8 as well as the anti-load side bracket 7 to which the outer wheel thereof is fitted.

The motor shaft 3 is axially supported by the load side bearing 6a and the anti-load side bearing 6b so that positions in the shaft direction of the anti-load side end thereof and the anti-load side end of the anti-load side bearing 6b are substantially matched with each other. In other words, the motor 100 is formed so that the positions in the shaft direction of the anti-load side end of the motor shaft 3 and the anti-load side end of the anti-load side bearing 6b are substantially matched with each other. It should be noted that the motor shaft 3 in the present embodiment is integrally formed of a magnetic material such as iron. By integrally forming the motor shaft 3, strength of the motor shaft itself can be improved, and manufacturing cost and labors at the time of coupling can be reduced in comparison to a case where a plurality of motor shafts is coupled. Further, by making the motor shaft 3 of a magnetic material, cost of the motor shaft itself can be reduced in comparison to a case where the motor shaft is made of a non-magnetic material. In consideration with the influence of the magnetic flux of the motor 100 and the like, it is thought that an expensive pressure welding shaft formed by a non-magnetic body and a magnetic body is used as the motor shaft. However, in the present embodiment, by having a configuration that the magnetic flux is shielded and the like, the motor shaft 3 integrally formed of a magnetic material can be used. As one of this configuration, a concave part 3A is formed in the anti-load side end of this motor shaft 3. Configurations of this concave part 3A and other parts will be described with reference to FIG. 2.

Figure 2:
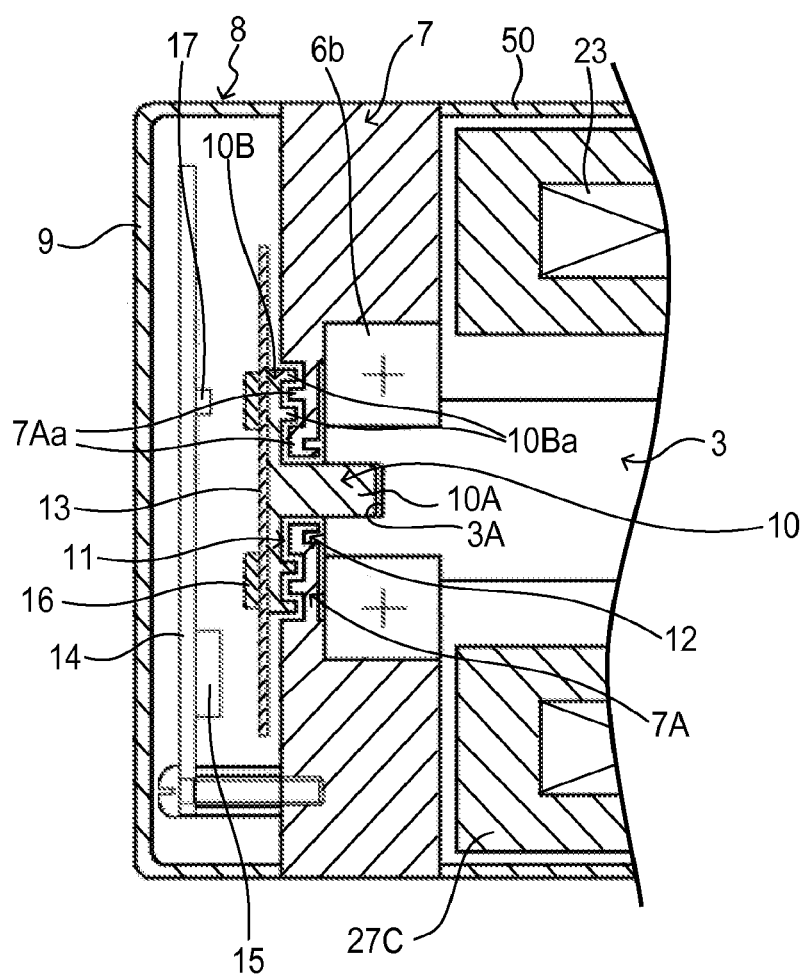
FIG. 2 is an enlarged view in which parts are extracted from FIG. 1, showing detailed structures of the encoder and a bearing cover.

FIG. 2 is an enlarged view in which parts are extracted from FIG. 1, showing the detailed structures of the encoder 8 and the bearing cover 7A.

In FIG. 2, the encoder 8 includes a hub 10, a glass rotating disc 13 fixed to an anti-load side (left side in FIG. 2) end of this hub 10, a substrate 14 disposed on the anti-load side of this rotating disc 13 and made of a resin for example, a disc magnet 16 fixed to an anti-load side surface of the rotating disc 13, and a magnetic field detection element 17 and an optical module 15 fixed to a load side (right side in FIG. 2) surface of the substrate 14.

The hub 10 is made of a non-magnetic material such as a resin, aluminum, and an austenite stainless steel. A convex part 10A is formed in a load side end of this hub 10. This convex part 10A is fitted to the concave part 3A of the motor shaft 3 so that the hub 10 is fixed to the motor shaft 3. It should be noted that the convex part 10A of the hub 10 may be fixed to the concave part 3A of the motor shaft 3 for example by a fixing method by an appropriate adhesive, a fixing method of cooling the convex part 10A of the hub 10 by an appropriate cooling material (such as liquid nitrogen and dry ice) (cooling fit), or the like. Thereby, the hub 10 is fixed coaxially with the anti-load side end of the motor shaft 3. The hub 10 also includes a circular plate part 10B disposed so as to face the anti-load side of the bearing cover 7A of the anti-load side bracket 7. This circular plate part 10B includes two protruding parts 10Ba serving as a first protruding part protruding on the one side in the shaft direction (on the right side in FIG. 2) on an outer surface on the side of the bearing cover 7A, the protruding parts being arranged in a concentric manner in this example. It should be noted that although the hub 10 integrally includes the two protruding parts 10Ba in this example, the present invention is not limited to this, and the hub and the first protruding part may be provided as separate bodies.

The disc magnet 16 is a permanent magnet of a circular plate shape. It should be noted that for example, a rare earth sintered magnet, a ferrite sintered magnet, a rare earth bond magnet, a ferrite bond magnet, an alnico magnet, a ferrite rubber magnet, or the like may be used as the disc magnet 16.

The magnetic field detection element 17 detects a magnetic field generated from the disc magnet 16. For example, a magnetoresistance element, a Hall element, or the like can be used as this magnetic field detection element 17. This magnetic field detection element 17 magnetically detects a position of the motor shaft 3 (such as an absolute position and a multi-rotation amount) by detecting strength or the direction of the magnetic field from the disc magnet 16 which is rotated with the rotating disc 13 so that the strength, the direction, or the like of the magnetic field is changed.

The optical module 15 is formed by a light emitter that emits light and includes, for example, LED (Light Emitting Diode), and a light receiver that is capable of receiving the light generated from this light emitter and includes, for example, photo diode. The light receiver receives the light emitted from the light emitter and reflected from a pattern (not shown) formed in the rotating disc 13, so as to optically detect a relative position from an original position and the absolute position of the motor shaft 3.

With the above configuration, the encoder 8 functions as an encoder using both the magnetic and optical type encoders (so-called "hybrid type" encoder). The optical type encoder functions as a so-called "reflection type" encoder.

The bearing cover 7A of the anti-load side bracket 7 includes two protruding parts 7Aa serving as a second protruding part protruding on the other side in the shaft direction (on the left side in FIG. 2) on an outer surface on the side of the circular plate part 10B of the hub 10, the protruding parts being arranged in a concentric manner in this example. These two protruding parts 7Aa and the two protruding parts 10Ba of the circular plate part 10B of the hub 10 are provided so as to face each other, so that the circular plate part 10B and the bearing cover 7A form a meandering shape gap 11, that is, the gap of a labyrinth structure between the outer surfaces facing each other. In other words, the circular plate part 10B is formed so that the circular plate part 10B and the bearing cover 7A form the gap 11 of the labyrinth structure between the outer surfaces facing each other by the protruding parts 10Ba and the protruding parts 7Aa. An oil reservoir 12 for attaching grease of the anti-load side bearing 6b atomized by a temperature increase of the motor 1 with the encoder due to the rotation of the motor shaft 3 for example is formed in apart of the bearing cover 7A covering the anti-load side end of the motor shaft 3.

As described above, the motor 1 with the encoder of the present embodiment has the motor 100 including the motor electromagnetic part 100A and the brake part 100B, and the encoder 8. The motor electromagnetic part 100A, the brake part 100B, and the encoder 8 are disposed in series in this order in the shaft direction of the motor shaft 3 from the load side (right side in FIG. 1) to the anti-load side (left side in FIG. 1).

In general, the magnetic and optical type encoders are mainly used as the encoder. In comparison to the optical type encoder, the magnetic type encoder is simpler in a structure, smaller in the number of parts, and more resistant to vibration and impact. Thus, in many cases, the magnetic type encoder is adopted alone or adopted together with the optical type encoder. In order to detect a rotation angle of a rotating body such as the motor shaft, the magnetic type encoder includes the disc magnet fixed to the rotating body, and the magnetic field detection element fixed to a fixed body such as the substrate, so as to detect an absolute position of the rotating body. Therefore, there is a concern that the magnetic flux on the side of the motor is leaked out to the side of the encoder via the motor shaft and the hub fixed to the anti-load side end of this motor shaft, and interferes with the magnetic field of the magnetic type encoder.

In the motor with the encoder with the configuration that the motor electromagnetic part, the brake part, and the encoder are disposed in series in this order in the shaft direction of the motor shaft from the load side to the anti-load side as described above, it is thought that the leaked magnetic flux from the motor electromagnetic part and the brake part, particularly the magnetic flux from the brake part disposed adjacent to the encoder is leaked out to the side of the encoder via the motor shaft and the hub fixed to the anti-load side end of this motor shaft. Particularly, in a case of the structure that a convex part is provided in the end of the motor shaft, and this is inserted into a concave part or a hole part provided in the hub so that the motor shaft and the hub are fixed, the motor shaft comes deep inside the side of the encoder, and a front end of the motor shaft becomes thinner. Thus, the highly densified magnetic flux is eradiated in the vicinity of the encoder so that a magnetic path through which the consequently-leaked magnetic flux passes inside the encoder is formed. There is a concern that such a leaked magnetic flux interferes with the magnetic flux of the disc magnet of the magnetic type encoder, and a detection result by the encoder is influenced. It should be noted that although such interference due to the magnetic field is not as remarkable as the magnetic type encoder, there is a concern that the interference also influences an electronic circuit and the like in the optical type encoder.

In the motor 1 with the encoder of the present embodiment, as described above, the convex part 10A is formed in the load side (right side in FIG. 2) end of the hub 10 of the encoder 8, and the convex part 3A is formed in the anti-load side (left side in FIG. 2) end of the motor shaft 3. The convex part 10A of the hub 10 is fitted to the concave part 3A of the motor shaft 3 so that the hub 10 is fixed to the motor shaft 3. Thereby, the motor shaft 3 can be isolated from the encoder 8, and the front end of the motor shaft can be thicker. Thus, the magnetic flux is not readily leaked out from the side of the motor shaft 3 to the side of the hub 10. As a result, the influence of the magnetic flux is reduced, so that further reliability of the encoder can be improved. Since the leakage of the magnetic flux can be suppressed, there is no need for using a non-magnetic material or a pressure welding shaft as the motor shaft 3. Thus, the manufacturing cost and the labors at the time of manufacturing can be reduced. The convexo-concave structure as in the present embodiment is particularly effective in a case where the motor 100 has the brake part 100B as in the present embodiment. This is because, due to the structure that the brake part 100B is disposed on the anti-load side of the motor electromagnetic part 100A, that is, adjacent to the encoder 8, and the armature 29 for performing the braking of the brake disc 33 is moved in the shaft direction by excitation of the excitation coil 23, the excitation coil 23 of the brake part 100B generates the magnetic flux in the shaft direction, so that the leakage of the magnetic flux from the side of the motor 100 as described above is readily generated. In a case where the hub 10 has the circular plate part 10B as in the present embodiment, the magnetic flux passing through between the circular plate part 10B and the anti-load side bracket 7 can be further reduced.

In the present embodiment, the following effects can be obtained. That is, in general, when the temperature of the motor with the encoder is increased due to the rotation of the motor shaft, the grease of the anti-load side bearing is atomized and scattered. A major part of the atomized grease is attached to the oil reservoir provided in the bearing cover of the anti-load side bracket. However, there is a fear that part of the grease is leaked out from a gap between the bearing cover and the hub to the side of the encoder. In this case, in a case where the optical type encoder is used, there is a concern that the grease is attached to optical parts such as the light emitter and the light receiver thereof and the rotating disc, and a light amount reaching from the light emitter to the light receiver is decreased, so that the detection result by the encoder is influenced. Therefore, in the present embodiment, as described above, the circular plate part 10B disposed so as to face the anti-load side of the bearing cover 7A provided in the anti-load side bracket 7 is provided in the hub 10, the protruding parts 10Ba are provided in this circular plate part 10B, and the protruding parts 7Aa are provided in the bearing cover 7A. The circular plate part 10B and the bearing cover 7A form the gap 11 of the labyrinth structure between the outer surfaces facing each other by the protruding parts 10Ba and the protruding parts 7Aa. Thereby, the atomized grease of the anti-load side bearing 6b can be suppressed from entering the encoder 8. As a result, further reliability of the encoder can be improved. With such a labyrinth structure, the circular plate part 10B of the hub 10 can exert both a magnetic flux shielding effect and a grease shielding effect. Thus, the number of parts can be reduced, the manufacturing cost can be suppressed, and the encoder 8 can be thinner.

In the present embodiment, particularly, the motor 100 is formed so that the positions in the shaft direction of the anti-load side end of the motor shaft 3 and the anti-load side end of the anti-load side bearing 6b are substantially matched with each other. Thereby, in comparison to a structure that the same anti-load side end of the motor shaft protrudes from the anti-load side end of the anti-load side bearing, a structure that the bearing cover 7A extends to the side of the end of the motor shaft 3 so as to cover not only the anti-load side end of the anti-load side bearing 6b but also the anti-load side end of the motor shaft 3 can be obtained. As a result, the more gap 11 of the labyrinth structure can be formed between the outer surfaces of the circular plate part 10B and the bearing cover 7A, so that an effect of suppressing the grease from entering the encoder 8 can be more enhanced. The oil reservoir 12 is formed in the part of the bearing cover 7A covering the end of the motor shaft 3, so that the major part of the atomized grease can be attached.

In the present embodiment, the following effects can be obtained. That is, in general, the motor has a structure that the motor electromagnetic part includes both the load side bearing and the anti-load side bearing rotatably supporting the motor shaft. Therefore, in a case where the motor electromagnetic part, the brake part, and the encoder are disposed in series in this order in the shaft direction of the motor shaft from the load side to the anti-load side, the motor shaft supported by the load side bearing and the anti-load side bearing in the motor electromagnetic part protrudes in a cantilever shape on the anti-load side, and the brake part and the encoder are provided in a protruding part thereof. In a case of such a structure, there is a concern that rotation instability is generated in the anti-load side end of the motor shaft, and the detection result by the encoder is influenced. Therefore, in the present embodiment, as described above, the anti-load side bearing 6b is disposed between the brake part 100B and the encoder 8. In such a way, since the anti-load side bearing 6b is disposed between the brake part 100B and the encoder 8, an inter-bearing distance between the load side bearing 6a and the anti-load side bearing 6b can be elongated. Thus, the rotation instability in the anti-load side end of the motor shaft 3 can be suppressed. Thereby, further reliability of the encoder can be improved.

In the present embodiment, particularly, the hub 10 of the encoder 8 is made of a non-magnetic material. Since the hub 10 is made of a non-magnetic material, the leaked magnetic flux from the motor electromagnetic part 100A and the brake part 100B of the motor 100 can be shielded or reduced by the hub 10. Thus, the influence of the magnetic flux can be further reduced.

Obviously, numerous modifications and variations of the present invention are possible in light of the above teachings. It is therefore to be understood that within the scope of the appended claims, the invention may be practiced otherwise than as specifically described herein.

Hereinafter, such modifications will be described.

(1) In a case where a substrate is disposed closer to a motor than a rotating disc.

Although the substrate 14 is disposed on the anti-load side of the rotating disc 13 (on the left side in FIG. 2) in the encoder 8 in the above embodiment, the present invention is not limited to this. That is, the substrate may be disposed on the load side of the rotating disc 13 (on the side of the motor 100) in the encoder.

Figure 3:
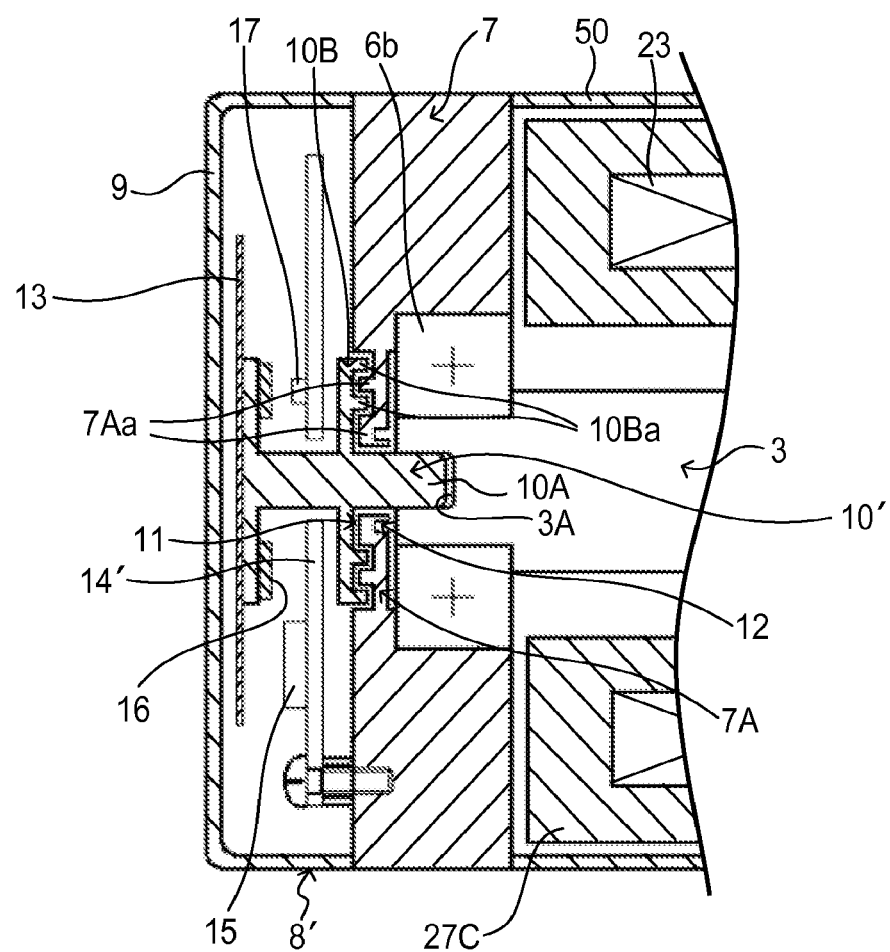
FIG. 3 is an enlarged view in which parts are extracted from FIG. 1, showing detailed structures of an encoder and the bearing cover in a modification in which a substrate is disposed closer to the motor than a rotating disc.

A vertically sectional view showing the entire configuration of the motor 1 with the encoder of the present modification is the same as FIG. 1 described above. Detailed structures of an encoder and the bearing cover 7A provided in the motor 1 with the encoder of the present modification will be described with using FIG. 3 corresponding to an enlarged view in which parts are extracted from FIG. 1. It should be noted that FIG. 3 is a view corresponding to FIG. 2 described above. The same parts as FIG. 2 will be denoted with the same reference numerals, and explanation thereof will be appropriately omitted.

In FIG. 3, an encoder 8' in the present modification includes a hub 10', the rotating disc 13 fixed to an anti-load side (left side in FIG. 3) end of this hub 10' and made of glass, a resin, a metal, or the like for example, a substrate 14' disposed on the load side of this rotating disc 13 (on the right side in FIG. 3) and provided at an intermediate position in a shaft part of the hub 10', the disc magnet 16 fixed to a load side surface of the anti-load side end of the hub 10', and the magnetic field detection element 17 and the optical module 15 fixed to an anti-load side surface of the substrate 14'.

The hub 10' is made of a non-magnetic material as well as the hub 10 in the above embodiment, and the convex part 10A is formed in a load side end thereof. This convex part 10A is fitted to the concave part 3A formed in the motor shaft 3 described above so that the hub 10' is fixed to the motor shaft 3. Thereby, the hub 10' is fixed coaxially with the anti-load side end of the motor shaft 3. As well as the hub 10 in the above embodiment, the hub 10' includes the circular plate part 10B disposed so as to face the anti-load side of the bearing cover 7A of the anti-load side bracket 7 described above, the circular plate part including the two protruding parts 10Ba.

It should be noted that in the present modification, the substrate 14' is particularly preferably made of a resin which is a non-conducting body (insulating body). By making the substrate 14' of a resin which is a non-conducting body, generation of electromagnetic noise can be suppressed.

Functions and configurations of the disc magnet 16, the magnetic field detection element 17, and the optical module 15 are substantially the same as the above embodiment. Therefore, as well as the encoder 8 in the above embodiment, the encoder 8' in the present modification functions as a hybrid type encoder using both the magnetic and optical type encoders, and the optical type encoder functions as a reflection type encoder.

Since parts other than the above parts are substantially the same as FIG. 2 described above, explanation thereof will be omitted.

As described above, in the present modification, the encoder 8' includes the substrate 14' in which the optical module 15 including the light emitter and the light receiver is provided, and the substrate 14' is disposed on the load side (on the right side in FIG. 3) of the rotating disc 13. That is, the rotating disc 13 is disposed on the anti-load side of the substrate 14' (on the left side in FIG. 3) in the encoder 8'. At the time of assembling the encoder 8' with such a configuration to the motor 100, firstly, the hub 10' is fixed to the anti-load side end of the motor shaft 3, the substrate 14' is provided in the middle of the shaft part of this hub 10', and finally, the rotating disc 13 is fixed to the anti-load side end of the hub 10'. With such an assembling order, at the time of assembling, position matching of a slit on the rotating disc 13 and the optical module 15 on the substrate 14' can be easily performed while seeing through the glass rotating disc 13 from the anti-load side, so that assembling workability can be improved.

(2) Others

Although a case where the reflection type encoder is used as the optical type encoder regarding the encoder 8, 8' serving as the hybrid type encoder using both the magnetic and optical type encoders is described above as an example, the present invention is not limited to this. That is, a so-called "transmission type" encoder in which the light emitter and the light receiver are disposed so as to face each other with respect to the rotating disc, and the light receiver receives the light emitted from the light emitter and transmitted through the slit serving as a transmission part formed in the rotating disc, so that the relative position from the original position and the absolute position of the motor shaft 3 are detected may be used as the optical type encoder. In a case where such a transmission type encoder is used, the same effects as the above embodiment and the modification (1) are also obtained.

Apart from the methods already described above, the methods of the above embodiment and the modification may be appropriately combined and utilized.

Furthermore, although not described one by one, the present invention can be variously modified and practiced within a range not departing from the gist thereof.

What is claimed as new and is desired to be secured by Letters Patent of the United States is:

1. A motor with an encoder, comprising: a motor; and an encoder disposed on the anti-load side of the motor, wherein the motor includes a motor electromagnetic part, and an output shaft rotatably supported by a load side bearing and an anti-load side bearing, the encoder includes a hub having a convex part formed in a load side end thereof, the hub being coaxially fixed to an anti-load side end of the output shaft, and a rotating disc fixed to an anti-load side end of the hub, and the convex part of the hub is fitted to a concave part formed in the anti-load side end of the output shaft so that the hub is fixed to the output shaft.

2. The motor with the encoder according to claim 1, wherein the motor includes a brake part disposed on the anti-load side of the motor electromagnetic part.

3. The motor with the encoder according to claim 1, wherein the motor includes an anti-load side bracket supporting the anti-load side bearing at an inner circumferential part and having a bearing cover covering an anti-load side end of the anti-load side bearing, the hub includes a circular plate part disposed so as to face the anti-load side of the bearing cover, the circular plate part includes at least one first protruding part protruding in the shaft direction on an outer surface on the side of the bearing cover, the bearing cover includes at least one second protruding part protruding in the shaft direction on an outer surface on the side of the circular plate part, and the circular plate part and the bearing cover form a gap of a labyrinth structure between the outer surfaces facing each other by the first protruding part and the second protruding part.

4. The motor with the encoder according to claim 3, wherein the motor is formed so that positions in the shaft direction of the anti-load side end of the output shaft and the anti-load side end of the anti-load side bearing are substantially matched with each other.

5. The motor with the encoder according to claim 2, wherein the anti-load side bearing is disposed between the brake part and the encoder.

6. The motor with the encoder according to claim 1, wherein the encoder includes a substrate provided with at least one of a light emitter and a light receiver, and the substrate is disposed on the load side of the rotating disc.

7. The motor with the encoder according to claim 1, wherein the encoder includes a substrate provided with at least one of a light emitter and a light receiver, and the substrate is disposed on the anti-load side of the rotating disc.

8. The motor with the encoder according to claim 1, wherein the hub is made of a non-magnetic material, and the output shaft is made of a magnetic material.

9. An encoder for a motor disposed on the anti-load side of the motor including a motor electromagnetic part, and an output shaft rotatably supported by a load side bearing and an anti-load side bearing, the encoder comprising: a hub having a convex part formed in a load side end thereof, the hub being coaxially fixed to an anti-load side end of the output shaft; and a rotating disc fixed to an anti-load side end of the hub, wherein the convex part of the hub is fitted to a concave part formed in the anti-load side end of the output shaft so that the hub is fixed to the output shaft.

\* \* \* \* \*